US007528350B2

(12) United States Patent
Nakagawa et al.

(10) Patent No.: US 7,528,350 B2
(45) Date of Patent: May 5, 2009

(54) PROCESS FOR PRODUCING PTC ELEMENT/METAL LEAD ELEMENT CONNECTING STRUCTURE AND PTC ELEMENT FOR USE IN THE PROCESS

(75) Inventors: Atsushi Nakagawa, Ibaraki (JP); Arata Tanaka, Ryugasaki (JP); Mikio Iimura, Inashiki (JP)

(73) Assignee: Tyco Electronics Raychem KK, Kanagawa (JP)

( * ) Notice: Subject to any disclaimer, the term of this patent is extended or adjusted under 35 U.S.C. 154(b) by 350 days.

(21) Appl. No.: 10/526,705

(22) PCT Filed: Sep. 3, 2003

(86) PCT No.: PCT/JP03/11222

§ 371 (c)(1),
(2), (4) Date: Nov. 14, 2005

(87) PCT Pub. No.: WO2004/023499

PCT Pub. Date: Mar. 18, 2004

(65) Prior Publication Data

US 2006/0102692 A1 May 18, 2006

(30) Foreign Application Priority Data

Sep. 6, 2002 (JP) ............................ 2002-261457

(51) Int. Cl.
*H05B 3/08* (2006.01)
*A47J 36/02* (2006.01)

(52) U.S. Cl. ..................... 219/541; 338/22 R; 338/309; 338/312; 338/314; 338/322; 338/324; 338/327; 338/328; 228/101; 427/102; 427/103

(58) Field of Classification Search ............... 338/22 R, 338/309, 312, 314, 322, 324, 327–8; 427/102, 427/103; 228/101; 219/541
See application file for complete search history.

(56) References Cited

U.S. PATENT DOCUMENTS 4,730,102 A * 3/1988 Melanson .................. 219/541
4,876,439 A 10/1989 Nagahori .................... 219/541
5,874,885 A * 2/1999 Chandler et al. .......... 338/22 R

FOREIGN PATENT DOCUMENTS

JP 62-23001 A 10/1987
JP 7-214369 8/1995

OTHER PUBLICATIONS

International Search Report for International Application No. PCT/JP2003/011222, mailed Dec. 9, 2003.
"Solid-State Laser for Materials Processing", by Iffländer, R. (Germany), the first edition, issued by Springer Verlag, p. 323, 2001.
"Processing Laser" by Masaru Kanaoka, the first edition, issued by Mikkan Kogyo Shinbunsha, pp. 6 to 7, 1999.

* cited by examiner

*Primary Examiner*—Shawntina Fuqua

(57) ABSTRACT

The present invention provides a novel method for electrical connection between a polymer PTC device and a metal lead element to thereby prevent the problems of the connection by caulking or soldering. For this purpose, the present invention provides a process for producing a connection structure by laser welding, said connection structure having (A) a PTC device (10) including (i) a laminar polymer PTC element (12) and (ii) a metal foil electrode (14) disposed on a main surface of the laminar polymer PTC element (12), and (B) a metal lead element (20) electrically connected to the metal foil electrode. The metal foil electrode (14) has at least two metal layers, one of which, the X-th layer, has laser beam absorption a % that is the lowest among the metal layers of the metal foil electrode (14). The X-th layer is present between a first metal layer (18) of the metal foil electrode and the laminar polymer PTC element (12). First metal layer (18) is located farthest from the laminar polymer PTC element (12) and has a laser beam absorption of b %, where b>a.

12 Claims, 2 Drawing Sheets

PROCESS FOR PRODUCING PTC ELEMENT/METAL LEAD ELEMENT CONNECTING STRUCTURE AND PTC ELEMENT FOR USE IN THE PROCESS

REFERENCE TO RELATED APPLICATIONS

This application is the National Stage of International Application No. PCT/JP 2003/011222, filed Sep. 3, 2003, the disclosure of which is incorporated herein by reference.

TECHNICAL FIELD

The present invention relates to a process for producing a connection structure between a polymer PTC device and a metal lead element, a connection structure produced by the same process, and a PTC device for use in the same process.

BACKGROUND ART

PTC (positive temperature coefficient) devices have come into wide use as circuit protection devices for a variety of electrical apparatuses or electronic apparatuses. Such PTC devices have characteristics in that the resistance thereof changes with a temperature, and rapidly changes (or increases) particularly at a specified threshold temperature, i.e., what is called a trip temperature. The characteristics that resistance increases, preferably rapidly increases, with a rise in temperature are called PTC characteristics.

In use, PTC devices are built in the electric circuits of electric or electronic apparatuses. For example, in case where some troubles occur in an apparatus in use to permit excessive current to flow into the electric circuit to raise the temperature of the apparatus, the temperature of the PTC device consequently reaches a threshold temperature and has very high resistance (e.g., the resistance becomes $1\times10^1$ to $1\times10^4$ or more times higher). As a result, if such a PTC device is built in an electric circuit and is present on a power supply line, the PTC device cuts off current to thereby prevent a failure in the electric apparatus. In case where an electric circuit having a PTC device built therein functions as a protection circuit in an apparatus, the resistance of the PTC device increases if an ambient temperature abnormally rises, and then, the PTC device switches a transistor in the protection circuit for detecting a change in voltage, so as to prevent a failure in the apparatus. Such PTC devices have been well known, and various types of PTC devices have been provided. For example, a PTC device is built in a protection circuit for electric circuits of a secondary battery in a portable telephone. If excessive current flows into the secondary battery in the course of charge or discharge of the battery, the PTC device cuts off the current to protect the battery.

As a typical example of existing PTC devices, a PTC device which comprises a laminar polymer PTC element produced from a polymer material having a conductive filler dispersed therein is known (see, e.g., Japanese Patent Kohyo Publication No. 10-501374 (1998, pages 7-15). The laminar polymer PTC element is produced by extrusion-molding a high density polyethylene which contains a conductive filler such as carbon black in a dispersed state. A PTC device is produced by disposing appropriate electrodes on both main surfaces of the polymer PTC element. Metal foil electrodes are used for such electrodes. The metal foil electrodes are bonded to the laminar polymer PTC element, for example, by thermocompression bonding.

The PTC device is built in a predetermined electric or electronic circuit by electrically connecting the metal foil electrodes thereof to metal lead elements. This electrical connection is generally done by caulking or soldering two elements, that is, the metal foil electrodes and the metal lead elements. In case of caulking, one of the elements has an opening, and the other element has a portion which has a complementary shape with a larger size relative to the opening, so that the portion of the other element is forced into the opening of the above one element so as to combine the two elements. Caulking, however, has a problem in that mechanical strength excessively acts on both of the two elements, resulting in possible damage in the PTC device.

In case of soldering, a soldering material is interposed and fused between two elements, however, the soldering material is required to be heated at high temperature for fusing. Recently, lead-free soldering has been proposed because a social problem arises because of lead contained in soldering materials. Generally, the lead-free soldering is carried out at higher temperatures than the conventional soldering, because of the higher fusing point. On the other hand, the metal foil electrodes of the PTC device are very thin and immediately transmit the heat for the soldering to the polymer PTC element, so that the polymer PTC element locally has high temperature to soften or melt. As a result, the dispersibility of the filler in the polymer locally becomes heterogeneous to change the PTC characteristics at such portions. Thus, there is a problem in that such change in PTC characteristics may give a serious influence on the performance of the PTC device as a whole. Therefore, a PTC element to be subjected to soldering is required to have a wide range of heat resistance in consideration of such an influence, and a PTC device comprising such a PTC element is demanded. Particularly in case of employing the lead-free soldering, a polymer PTC element having a far wider range of heat resistance is required.

BRIEF SUMMARY OF THE INVENTION

An object of the present invention is therefore to provide a novel method for electrical connection between a metal foil electrode on a polymer PTC element and a metal lead element to thereby provide a connection structure which can alleviate or preferably overcome the foregoing problem, i.e., the mechanical damage of the polymer PTC device which would be caused by the electrical connection between the polymer PTC device and the lead element by the above caulking or soldering, and the foregoing problem of the insufficient heat resistance of the polymer PTC device. Other objects of the present invention are to provide a process for producing such a connection structure and a PTC device for use in the same process.

The present inventors have extensively researched, and finally discovered that the foregoing problems can be solved by using a metal foil electrode having a specific constitution in a polymer PTC device when electrically connecting a metal lead element with such the metal foil electrode is carried out by laser welding. The present invention is accomplished based on such a finding.

In one aspect of the present invention, a novel process for producing a connection structure is provided. The connection structure which comprises (A) a PTC device comprising (i) a laminar polymer PTC element and (ii) a metal foil electrode disposed on a main surface of the laminar polymer PTC element, and (B) a metal lead element electrically connected to the metal foil electrode is produced through electrically connecting the metal foil electrode to the metal lead element by laser welding, wherein features of the connection structure rest in that the metal foil electrode comprises at least two metal layers and that a metal layer which has the lowest laser beam absorption (the X-th layer having a laser beam absorption of a %) among the metal layers of the metal foil electrode is present between a metal layer, of the metal foil electrode, located farthest from the laminar polymer PTC element (the first layer having a laser beam absorption of b % (b>a)) and the laminar polymer PTC element. It is noted that the "X" means an integer which is equal to or more than 2 and which is equal to or less than the total number of the metal layers forming the metal foil electrode.

In a preferred embodiment, the present invention provides the process for producing the connection structure, wherein the metal lead element comprises at least one metal layer, and a metal layer of the metal lead element which is in contact with the metal foil electrode has a laser beam absorption of c % which is higher than the laser beam absorption (a %) of the X-th layer of the metal foil electrode (c>a).

Another aspect of the present invention provides a connection structure produced by the above process. The connection structure comprises (A) a PTC device comprising (i) a laminar polymer PTC element and (ii) a metal foil electrode disposed on a main surface of the laminar polymer PTC element, and (B) a metal lead element electrically connected to the metal foil electrode, and is produced through electrically connecting the metal foil electrode to the metal lead element by laser welding, wherein the metal foil electrode comprises at least two metal layers, and a metal layer which has the lowest laser beam absorption (the X-th layer having a laser beam absorption of a %) among the metal layers of the metal foil electrode is present between a metal layer, of the metal foil electrode, located farthest from the laminar polymer PTC element (the first layer having a laser beam absorption of b % (b>a)) and the laminar polymer PTC element.

Another aspect of the present invention provides a PTC device for use in the above process. The PTC device comprises (i) a laminar polymer PTC element and (ii) a metal foil electrode disposed on a main surface of the laminar polymer PTC element, wherein the metal foil electrode is electrically connected to a metal lead element by laser welding, the metal foil electrode comprises at least two metal layers, and a metal layer which has the lowest laser beam absorption (the X-th layer having a laser beam absorption of a %) among the metal layers of the metal foil electrode is present between a metal layer, of the metal foil electrode, located farthest from the laminar polymer PTC element (the first layer having a laser beam absorption of b % (b>a)) and the laminar polymer PTC element.

In one embodiment of the present invention, there is provided the PTC device in which the metal foil electrodes are disposed on both main surfaces of the laminar polymer PTC element, and in which at least one of the metal foil electrodes is electrically connected to a metal lead element by laser welding.

In any of the aspects of the present invention, it is preferable that the metal foil electrode comprises two metal layers, and that the X-th layer is a metal layer of the metal foil electrode which is in contact with the laminar polymer PTC element.

Further, it is preferable that the metal foil electrode comprises three metal layers, and that the X-th layer is a metal layer of the metal foil electrode which is in contact with the laminar polymer PTC element, or a metal layer present between the first layer and a metal layer of the metal foil electrode which is in contact with the laminar polymer PTC element.

The use of the process for producing the connection structure according to the present invention makes it possible to produce and maintain the connection with sufficient connection strength between the metal foil electrode and the metal lead element, and to at least alleviate or preferably prevent the problem of a possible mechanical damage of the polymer PTC device which would occur in case where the polymer PTC device and the metal lead element are electrically connected to each other by caulking or soldering, and the problem of insufficient heat resistance of the polymer PTC device. Accordingly, the process of the present invention provides the connection structure which comprises the polymer PTC device and the metal lead element, and which has sufficient connection strength and also can at least alleviate or preferably prevent the problem of possible mechanical damage of the polymer PTC device and the problem of insufficient heat resistance of the polymer PTC device.

DETAILED DESCRIPTION OF THE INVENTION

Figure 1:
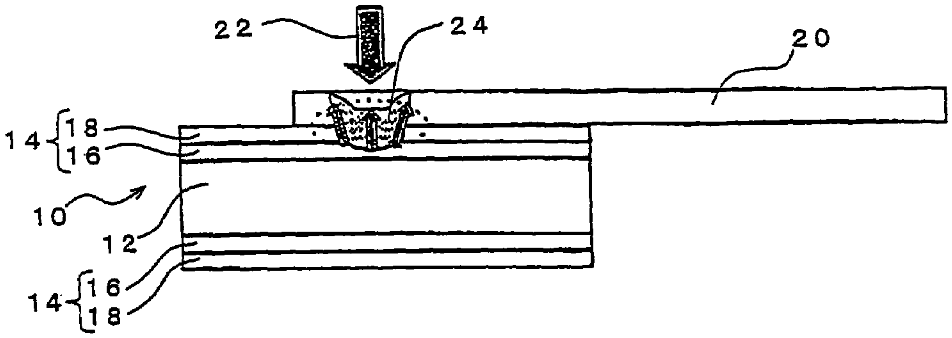
FIG. 1 is a sectional view of a PCT device, schematically illustrating a connection of a metal lead element to the PTC device.

In any of the above aspects of the present invention, the process for producing the connection structure, the connection structure produced by the same process, and the PTC device for use in the same process are essentially the same as conventional ones, except that the metal foil electrode and the metal lead element are connected to each other by means of laser, that the metal foil electrode comprises at least two metal layers, and that the metal layers of the metal foil electrode have the specific relationship in laser beam absorption.

The "laminar polymer PTC element" of the PTC device referred to in the present specification may be a known polymer material in so far as the polymer material is in the form of a laminate, and contains a conductive filler (for example, a high density polyethylene including carbon black particles dispersed therein) and has the PTC characteristics. Also, there is no particular limit in selection of the laminar polymer PTC element of the present invention, so long as it is possible to use in the process for producing the intended connection structure of the present invention. Specific examples thereof are PTC elements used in the PTC device described in Japanese Patent Kohyo Publication No. 10-501374.

Also, the "metal foil electrode" may be a known one in so far as it can be disposed on the laminar polymer PTC element so as to be used as the electrode, on condition that the metal foil electrode has the following specific constitution: that is, the metal foil electrode comprises at least two metal layers, and a metal layer having the lowest laser beam absorption (the X-th layer having a laser beam absorption of a %) among the metal layers of the metal foil electrode is present between a metal layer, of the metal foil electrode, located farthest from the laminar polymer PTC element (the first layer having a laser beam absorption of b % (b>a)) and the laminar polymer PTC element.

That is, the "metal foil electrode" of the present invention comprises a plurality of metal layers numbered as a first layer, a second layer, a third layer, . . . in order from the metal layer located farthest from the laminar polymer PTC element (or from the metal layer through which the metal foil electrode is in contact with the metal lead element) toward the metal layer which is in contact with the polymer PTC element. The feature of the metal foil electrode rests in that any of the metal layers other than the first layer has the lowest laser beam absorption among the metal layers of the metal foil electrode. In the present specification, the metal layer having the lowest laser beam absorption is referred to as the X-th layer. Accordingly, the relationship of (b>a) is established, supposing that the layer beam absorption of the metal layer (the first layer), of the metal foil electrode, located farthest from the laminar polymer PTC element is b % and that the lowest laser beam absorption of the metal layer (the X-th layer) is a %.

In case where the metal foil electrode of the present invention comprises two metal layers, the X-th layer is the second layer which is the metal layer in contact with the laminar polymer PTC element. Examples of such a metal foil electrode include a copper foil plated with nickel which is obtained by electro-plating or electroless-plating a rolled, electrolytic or electroless copper foil with nickel. One side of the nickel-plated copper foil which is to contact the polymer PTC element is subjected to adhesion-improving treatment, and then thermocompression-bonded to the polymer PTC element.

In case where the metal foil electrode of the present invention comprises three metal layers, the X-th layer is a second or third layer. That is, the X-th layer is a metal layer (the third layer), of the metal foil electrode, in contact with the laminar polymer PTC element, or a metal layer (the second layer), of the metal foil electrode, present between the first layer and the metal layer, of the metal foil electrode, in contact with the laminar polymer PTC element. In case that the X-th layer is the second layer, the laser beam absorption of the third layer may be higher or lower than that (b %) of the first layer, but it is higher than the laser beam absorption (a %) of the second layer. In case that the X-th layer is the third layer, the laser beam absorption of the second layer may be higher or lower than that (b %) of the first layer, but it is higher than the laser beam absorption (a %) of the third layer.

Other than the foregoing, the metal foil electrode of the present invention may comprise four or more metal layers. In this case, the X-th layer may be any of the metal layers other than the metal layer located farthest from the laminar polymer PTC element (the first layer having the laser beam absorption of b %), and the laser beam absorption of the X-th layer is a %. When the X-th layer is the second layer, the third layer and the fourth layer may have any laser beam absorption higher than a %. When the X-th layer is the third layer, the second layer and the fourth layer may have any laser beam absorption higher than a %. When the X-th layer is the fourth layer, the second layer and the third layer may have any laser beam absorption higher than a %.

In the present invention, particularly preferably, the metal foil electrode comprises two metal layers, and the X-th layer is the second metal layer, of the metal foil electrode, in contact with the laminar polymer PTC element.

The "laser beam absorption" referred to in the present specification means an absorption of laser beam for use in the formation of an electrical connection between the metal foil electrode and the metal lead element. Accordingly, the "laser" of the "laser beam absorption" means a specific laser beam (with a specific wavelength). The laser for use in the laser welding of the present invention may be any of appropriate lasers capable of forming connections by fusing and solidifying metals. Generally, lasers for cutting or welding metallic materials are used. Examples of such lasers are a YAG laser, $CO_2$ laser and the like.

The "laser beam absorption" referred to in the present specification is defined by the following equation (1) in which the unit is %.

$$\text{Laser beam absorption} = 100 - \text{reflectance (\%)} \qquad \text{Equation (1):}$$

Since the reflectance of laser beam (or its light energy) to a metal depends on wavelength of light, the laser beam absorption also changes depending on a change in reflectance. Metals show inherent reflectance corresponding to specific wavelengths of light. The reflectance of laser beams is described in scientific technological literature such as "Solid-State Laser for Materials Processing" by Iffländer, R. (Germany), the first edition, issued by Springer Verlag, p. 323, 2001, and "Processing Laser" by Masaru Kanaoka, the first edition, issued by Nikkan Kogyo Shinbunsha, p.p. 6 to 7, 1999.

The apparatus conditions such as a laser to be used and the output thereof, and the operating conditions such as irradiation time, etc. may be suitably selected in accordance with the type, thickness, etc. of the metal foil electrode and the metal lead element to be connected with each other.

For example, the absorption of copper (Cu) to a YAG laser with a wavelength of 1.06 μm is 10%, and that of nickel (Ni) is 28%. The absorption of Cu to a $CO_2$ laser with a wavelength of 10.6 μm is 1%, and that of Ni is 4%. Therefore, in case of a metal foil electrode comprising two metal layers, a Ni layer as the first layer is laminated on a Cu layer as the second layer (the X-th layer). More concretely, when any of the above lasers is used, a metal foil electrode in which one side of the copper foil (e.g., the electrolytic copper foil) is plated with nickel can be used in the PTC device.

In this regard, the difference between the absorption of the first layer (b %) and the absorption of the X-th layer (a %), namely, (b−a), is not particularly limited, in so far as the intended connection structure, the process for producing the same, and the PTC device for use in the process of the present invention can be obtained. However, the difference (b−a) is preferably larger than 5% (b−a>5%), more preferably larger than 10% (b−a>10%) and particularly preferably larger than 20% (b−a>20%), in view of the relationship with the foregoing conditions of laser welding.

In case where the metal foil electrode comprises at least two metal layers as in the present invention, the energy of laser beam applied to connect the metal foil electrode with the metal lead element is absorbed mainly by the metal lead element and the metal layer (the first layer), of the metal foil electrode, located farthest from the laminar polymer PTC element. As a result, the first layer and the metal lead element are locally fused and solidified. On the other hand, the metal foil electrode of the present invention comprises the metal layer (the X-th layer) having the lowest laser beam absorption between the first layer and the polymer PTC element, and the laser beam absorption (a %) of this layer is always lower than that (b %) of the first layer, i.e., b>a.

Therefore, the energy of the applied laser beam is hardly absorbed by the X-th layer to thereby prevent the energy from being directed to the PTC element from the X-th layer. As a result, the influence of the energy applied by the laser on the polymer PTC element can be minimized. In other words, the energy applied by the laser irradiation is maintained sufficient to locally fuse the metal lead element and the first layer adjacent thereto, while the influence of the energy remaining after used for the fusion, on the polymer PTC element can be at least alleviated, or preferably prevented by the X-th layer present between the first layer and the polymer PTC element.

The "metal lead element" of the present invention may be a known metal lead element for use in PTC devices, and there is no particular limit in selection of the metal lead element in so far as it can be used for the process for producing the intended connection structure of the present invention. However, it is preferable that the "metal lead element" of the present invention has a high laser beam absorption in order to smoothly transmit the energy from the metal lead element to the first layer so as to effectively utilize the energy from the laser to connect the metal foil electrode and the metal lead element to each other.

Further, the "metal lead element" of the present invention preferably comprises at least one metal layer. It is also preferable that the laser beam absorption (c %) of a metal layer, of the metal lead element, in contact with the metal foil electrode is higher than that (a %) of the X-th layer of the metal foil electrode (i.e., c>a). In case of c>a, the energy applied from the laser is sufficiently absorbed by the metal lead element and the first layer of the metal foil electrode, while the energy is hardly absorbed by the metal layer (the X-th layer) which has the lowest laser beam absorption among the metal layers of the metal foil electrode.

The difference between the laser beam absorption (c %) of the metal layer, of the metal lead element, in contact with the metal foil electrode and the laser beam absorption (a %) of the X-th layer of the metal foil electrode, i.e., (c−a) is preferably more than 5% (c−a>5%), more preferably more than 10% (c−a>10%), and particularly preferably more than 20% (c−a>20%).

In the present invention, the metal lead element may have any form, and it may be, for example, a laminar metal lead element. In this case, the metal lead element may be in the form of a sheet (for example, with a thickness of 0.5 to 1.5 mm), a thinner film (for example, with a thickness of 0.1 to 0.5 mm), or a far thinner foil (for example, with a thickness of 0.05 to 0.1 mm). Such a metal lead element may comprise a single layer or a plurality of layers. For example, the metal lead element may be a nickel lead element or a plated nickel lead element.

In a particularly preferred embodiment, the metal lead element is a nickel sheet (with a thickness of 1.0 to 1.25 mm), and the metal foil electrode is a nickel-plated copper foil in which a nickel plating layer (with a thickness of 10 to 30 μm) as the first layer is formed on a copper foil (with a thickness of 50 to 70 μm) as the second layer.

The PTC device generally comprises the metal foil electrodes on both main surfaces of the PTC element. To connect the metal lead elements to the metal foil electrodes by laser, it is sufficient to connect the metal lead element to at least one of the metal foil electrodes, but it is preferable to connect the metal lead elements to both the metal foil electrodes.

In the present invention, the connection by the laser may be carried out by any of known embodiments. For example, the metal lead element is laminated on the metal foil electrode of the PTC device and is allowed to contact the metal foil electrode within a predetermined area. Then, a predetermined portion of the metal lead element to be connected to the metal foil electrode is irradiated with the laser beam. The irradiation with the laser beam may be carried out in a manner of spot welding in which the laser beam is applied to a fixed intended portion for predetermined time (in this case, a single circular connection is formed), pulse welding in which the laser beam is pulse-like applied while an intended portion is being intermittently or continuously moved (in this case, a plurality of circular or elliptical welded portions spaced from one another are formed), or seam welding in which the laser beam is continuously applied while an intended portion is being continuously moved (in this case, a linear welded portion is formed).

In the present invention, pulse seam welding is particularly preferably employed for forming the connection. The pulse seam welding means a method of applying the laser beam so that circular or elliptical connections can be partially lapped over one another, but not that the connections spaced from one another are formed as in the case of pulse welding. This method is established by partially taking the features of the pulse welding and the seam welding, and thus is called "pulse seam welding". The pulse seam welding can be carried out by applying the laser beam while decreasing the moving distance of an intended portion, as compared with the case of pulse welding. This welding method has an advantage in that the strength of the connection formed by the welding is enhanced since the lapped welded portion is double or repeatedly irradiated with the energy of the laser beam, however, has a disadvantage in that a thermal influence on the polymer PTC element may increase in association with the repeated irradiation. In this regard, in the present invention, since the X-th layer which is the hardest to absorb the energy is present between the first layer of the metal foil electrode and the polymer PTC element, it is possible to suppress the influence of the double energy on the polymer PTC element.

As mentioned above, the present invention provides the process for producing the connection structure by laser welding, the connection structure comprising (A) the PTC device including (i) the polymer PTC element and (ii) the metal foil electrode, and (B) the meal lead element. Further, the invention provides the connection structure produced by the above process. Furthermore, the invention provides the PTC device for use in the above process. It is preferable that this PTC device is composed by disposing metal foil electrodes on both main surfaces of the laminar polymer PTC element, and that at least one of the metal foil electrodes is electrically connected to the metal lead element by laser welding. It is more preferable that the metal foil electrodes on both main surfaces of the PTC element are electrically connected to the metal lead elements by laser welding.

The present invention provides also a process of suppressing the thermal influence of the laser beam on the PTC element in the course of connecting the metal lead element with the metal foil electrode on the polymer PTC element. The characteristics of the suppressing process rest in that the metal foil electrode is composed of at least two metal layers, and that the metal layer which has the lowest laser beam absorption among the metal layers of the metal foil electrode (the X-th layer having the laser beam absorption of a %) is disposed between the metal layer, of the metal foil electrode, located farthest from the laminar polymer PTC element (the first layer having the laser beam absorption of b %) (b>a) and the laminar polymer PTC element.

That is, the suppressing process of the present invention is characterized in that the metal layer which has the lowest laser beam absorption among the metal layers of the metal foil electrode is a metal layer other than the first layer of the metal foil electrode. Thus arranged, the metal layer having relatively lower laser beam absorption than the first layer is disposed on the side of the PTC element. Accordingly, the amount of the energy absorbed is reduced by these metal layers, so that the amount of the energy transmitted to the PTC element is decreased. As a result, it becomes possible to minimize the influence of the laser beam on the PTC element.

Next, the present invention will be described in more detail with reference to the accompanying drawings.

FIG. 1 is a sectional view of a PTC device schematically illustrating the formation of a connection of a metal lead element to the PTC device. The PTC device (10) comprises a polymer PTC element (12) at the center thereof, and metal foil electrodes (14) on both sides of the PTC element (12). The metal foil electrode (14) comprises two layers, i.e., a metal layer (a second layer) (16) in contact with and located closer to the PTC element (12), and a metal layer (a first layer) (18) in contact with the metal lead element and located farther from the PTC element (12). The metal lead element (20) is disposed on the metal foil electrode (14) to be lapped thereover in a predetermined manner. Preferably, another metal lead element (20) is disposed on the metal foil electrode (14) on the underside of the PTC device (12) and similarly subjected to laser welding (not shown).

A laser beam is applied from above the metal lead element (20), to a predetermined portion at which the metal foil electrode (14) and the metal lead element (20) are overlapped on each other. The laser beam (22) having an output sufficient to fuse the metal lead element (20) and the first layer (18) is applied for predetermined time. The absorption of the second layer (16) with respect to the laser beam applied is a %, which is lower than the absorption (b %) of the first layer (18), that is, the relationship of a<b is established. Accordingly, the laser beam reflects on the interface between the second layer (16) and the first layer (18) as shown by the smaller arrows. As a result, although some thermal influence of the laser beam on the second layer (16) can not be eliminated, the influence can be suppressed to minimum, and consequently, the influence of the laser beam on the PCT element (12) can be minimized.

FIG. 1 shows a connection (24) formed by welding, which is schematically drawn by the dot line. As shown in FIG. 1, the connection (or the welded portion) (24), formed by the irradiation with the laser beam, extends to a part of the second layer in the proximity of the interface between the second layer and the first layer, but does not extend up to the interface between the second layer and the PTC element. In this regard, the laser beam absorption (c %) of the metal lead element (20) is preferably higher, particularly higher than the laser beam absorption (a %) of the second layer (16) (a<c), in view of the energy efficiency of the laser beam.

Figure 2:
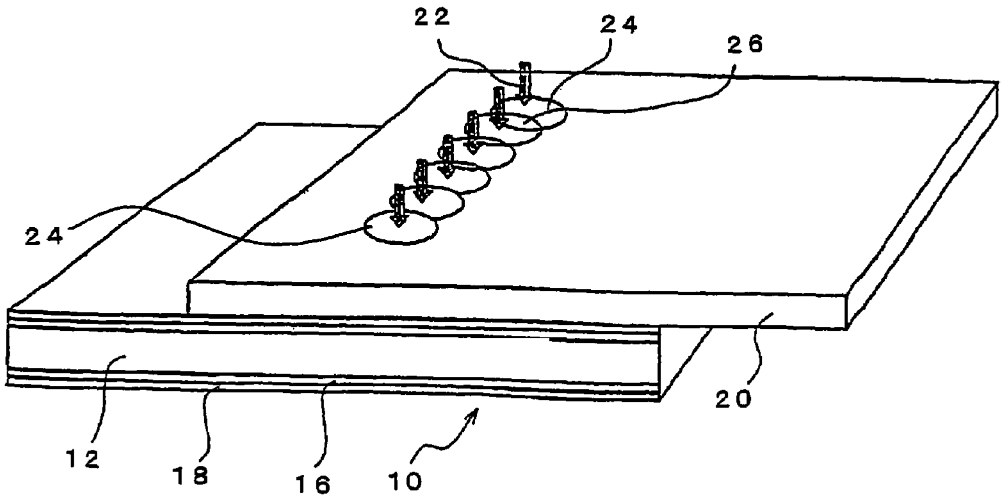
FIG. 2 is a perspective view of the PTC device, schematically illustrating pulse seam welding method.

FIG. 2 schematically shows the pulse seam welding method. As seen in FIG. 2, a plurality of circular welded portions (24) are formed, partially lapping over one another. This means that the lapped portions (26) are irradiated twice with laser beams and thus are subject to the influence of the thermal energy of the laser beam (22). However, in the process of the present invention, by selecting the laser beam absorption, such the influence can be suppressed to minimum, and particularly, it becomes possible to prevent the substantial adverse thermal influence on the PTC element (12).

According to one of the preferred embodiments, a nickel-plated copper foil (the thickness of nickel: 20 μm, and the thickness of copper: 60 μm) is used as the metal foil electrode of the PTC device, and a nickel sheet (the thickness: 1.25 mm) is used as the metal lead element. Then, a YAG laser with an output of 1.8 W per pulse is used to irradiate the nickel sheet and the nickel-plated copper foil for 0.7 seconds to carry out the pulse seam welding.

Hereinafter, the present invention will be described in more detail by way of an embodiment thereof, which, however, is illustrative only and is not to be construed as limiting the scope of the present invention in any way.

EXAMPLE

Figure 3:
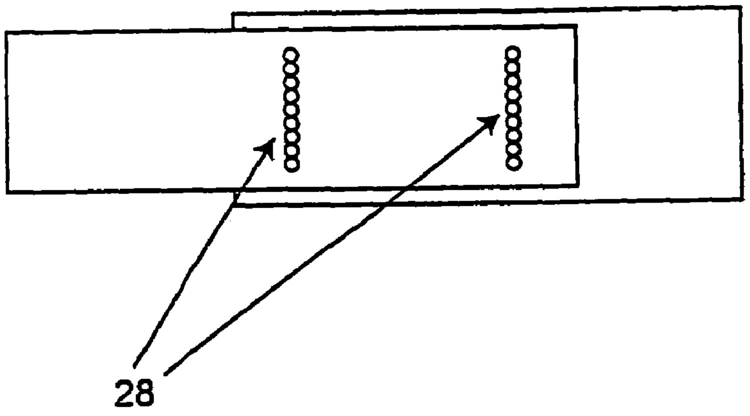
FIG. 3 is a top plan view of the PTC device, illustrating the welding of the metal lead element to the PCT device at two welded lines (one line is constituted by nine pulse seams).

A polymer PTC device (a chip for VTP210 (trade name), manufactured by Tyco Electronics) was used, which was obtained by thermocompression-bonding copper foils (thickness: 60 μm) plated with nickel layers (thickness: 20 μm) to both main surfaces of a polyethylene PTC element with a size of 5 mm (width)×12 mm (length)×0.25 mm (thickness) (LB832 (trade name) manufactured by MILENNIUM CHEMICAL, U.S.A.) as the polymer PTC element. As the metal lead element, a nickel lead element with a size of 4 mm (width)×16 mm (length)×1.25 mm (thickness) was used. A YAG laser beam with an output of 1.8 W per pulse was applied to the nickel lead element and the PTC device for 0.7 sec. to carry out the pulse seam welding. In this regard, nine pulses of laser beam application constitutes one line, and two lines of welding were carried out. FIG. 3 shows an example of two lines of welding of the metal lead element to the PTC device, wherein nine pulse seams constitute one line.

Figure 4:
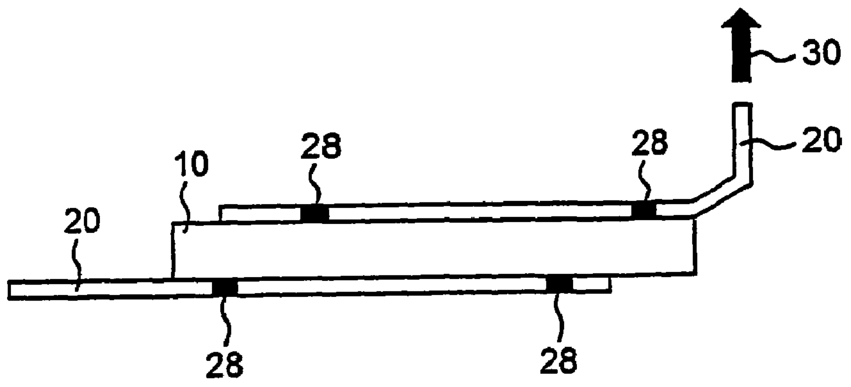
FIG. 4 is a schematic diagram illustrating a method for measuring lead tensile strength for use in the evaluation of the strength of a laser-welded portion.

Strength of the resultant laser-welded portion was evaluated by testing and measuring lead tensile strength. FIG. 4 schematically illustrates a method for measuring the lead tensile strength used for the evaluation of the strength of the laser-welded portion. As seen in FIG. 4, the metal lead elements (20) were welded to both main surfaces of the PTC device (10), and each of the metal lead elements (20) was connected to the PTC device (10) at two lines of welded portions, wherein one line was constituted by nine pulse seams. The welded portions were shown as pulse seam welded portions (28). In this regard, the PTC element (12) and the metal foil electrodes (14) are not shown in FIG. 4. The lead tensile strength was measured using a digital force gauge (DSP-20 (trade name) manufactured by AMDA), by pinching an end portion of the metal lead element (20) and pulling it upward at 90 degrees (i.e. the pulling direction (30)) and at a regular speed of 60 mm/min. Then, the maximum force applied was measured. Fifty samples obtained by the above laser welding were produced, and their lead tensile strength was measured. As a result, it was found that the lead tensile strength was 18.24 N (1.86 Kgf) on the average, and that the standard deviation was 3.33 N (0.34 Kgf). Since the lead tensile strength is generally required to be not less than 4.90 N (0.5 Kgf), it is confirmed that the welded strength resulting from the laser welding carried out in Example 1 was sufficiently large.

The pulse seam connection (28) between the PTC device (10) and the metal lead element (20) of Embodiment 1 was photographed from the side with an X-ray camera and carefully observed. As a result, it was apparent that no damage occurred in the polymer PTC element (12) of the polymer PTC device (10) by means of the pulse seam welding.

What is claimed is:

1. A process for producing a connection structure which process comprises (1) providing (A) a PTC device including (i) a laminar polymer PTC element and (ii) a metal foil electrode disposed on a main surface of the laminar polymer PTC element, the metal foil electrode comprising at least two metal layers, one of which, the X-th layer, having a laser beam absorption of a % that is the lowest laser beam absorption of the metal layers of the metal foil electrode, and another of which, the first layer, having a laser beam absorption of b %, where b >a, and being located farthest from the laminar polymer PTC element, said X-th layer being positioned between the laminar polymer PTC element and the first layer, and (B) a metal lead element, and (2) electrically connecting the metal foil electrode to the metal lead element by laser welding.

2. The process according to claim 1, wherein the metal foil electrode comprises two metal layers, and the X-th layer is a metal layer of the metal foil electrode which is in contact with the laminar polymer PTC element.

3. The process according to claim 1, wherein the metal foil electrode comprises three metal layers, and the X-th layer is a metal layer of the metal foil electrode which is in contact with the laminar polymer PTC element, or a metal layer present between the first layer and a metal layer of the metal foil electrode which is in contact with the laminar polymer PTC element.

4. The process according to claim 1, wherein the difference (b−a) is larger than 5%.

5. The process according to claim 1, wherein the metal lead element comprises at least one metal layer, and a metal layer of the metal lead element which is in contact with the metal foil electrode has a laser beam absorption of c % which is higher than the laser beam absorption (a %) of the X-th layer of the metal foil electrode.

6. The process according to claim 5, wherein the difference (c−a) is larger than 5%.

7. The process according to claim 1, wherein the laser beam is a YAG laser beam.

8. The process according to claim 7, wherein the metal foil electrode is a nickel-plated copper foil, and the metal lead element is nickel.

9. A connection structure produced by the process according to claim 1.

10. A PTC device for use in the process according to claim 1.

11. The PTC device according to claim 10, wherein the metal foil electrodes are disposed on both main surfaces of the laminar polymer PTC element, and at least one of the metal foil electrodes is electrically connected to the metal lead element by laser welding.

12. The process according to claim 1, wherein the metal foil electrode comprises three metal layers, and the X-th layer is a metal layer of the metal foil electrode present between the first layer and a metal layer of the metal foil electrode which is in contact with the laminar polymer PTC element.

* * * * *